US012741420B2

(12) United States Patent
Jahnle et al.

(10) Patent No.: US 12,741,420 B2
(45) Date of Patent: Sep. 22, 2026

(54) DEVICE AND METHOD FOR THE ADDITIVE MANUFACTURING OF A THREE-DIMENSIONAL WORKPIECE

(71) Applicant: Robert Bosch GmbH, Stuttgart (DE)

(72) Inventors: Hendrik Jahnle, Leutenbach (DE); Hans Bargen, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 380 days.

(21) Appl. No.: 18/253,560

(22) PCT Filed: Nov. 22, 2021

(86) PCT No.: PCT/EP2021/082464
§ 371 (c)(1),
(2) Date: May 18, 2023

(87) PCT Pub. No.: WO2022/106678
PCT Pub. Date: May 27, 2022

(65) Prior Publication Data

US 2023/0415420 A1 Dec. 28, 2023

(30) Foreign Application Priority Data

Nov. 23, 2020 (DE) ..................... 10 2020 214 692.6

(51) Int. Cl.
*B29C 64/371* (2017.01)
*B29C 64/209* (2017.01)
(Continued)

(52) U.S. Cl.
CPC .......... *B29C 64/371* (2017.08); *B29C 64/209* (2017.08); *B29C 64/232* (2017.08);
(Continued)

(58) Field of Classification Search
CPC ... B29C 64/371; B29C 64/209; B29C 64/232; B29C 64/236; B29C 64/245;
(Continued)

(56) References Cited

U.S. PATENT DOCUMENTS

2004/0206246 A1* 10/2004 Bortone .................. B29C 48/92 99/450.2
2007/0074659 A1* 4/2007 Wahlstrom ............. B33Y 40/00 118/712

(Continued)

FOREIGN PATENT DOCUMENTS

DE 102017211279 A1 1/2019
DE 102017122849 A1 4/2019

(Continued)

OTHER PUBLICATIONS

International Search Report for PCT/EP2021/082464, Issued Feb. 23, 2022.

*Primary Examiner* — Xiao S Zhao
(74) *Attorney, Agent, or Firm* — Norton Rose Fulbright US LLP

(57) ABSTRACT

A device for the additive manufacturing of a three-dimensional workpiece. The device includes a build chamber, at least one printhead, a receiving device for receiving the three-dimensional workpiece, an air-circulation system for controlling the temperature of and conveying a gaseous fluid, and an adjustment device including an x-y axis system with a printhead receptacle and a z-axis system. The air-circulation system includes a device for controlling the temperature of and conveying a gaseous fluid, an inlet device including at least two inlet openings connected to the build chamber, and an outlet device integrated in the z-axis system and disposed in such a way that it can be adjusted using the axis system. A method for the additive manufac- (Continued)

turing of a three-dimensional workpiece using the device is also described.

7 Claims, 4 Drawing Sheets

(51) Int. Cl.

| | |
|---|---|
| ***B29C 64/232*** | (2017.01) |
| ***B29C 64/236*** | (2017.01) |
| ***B29C 64/245*** | (2017.01) |
| ***B29C 64/25*** | (2017.01) |
| ***B29C 64/393*** | (2017.01) |
| ***B33Y 30/00*** | (2015.01) |
| ***B33Y 50/02*** | (2015.01) |

(52) U.S. Cl.
CPC .......... *B29C 64/236* (2017.08); *B29C 64/245* (2017.08); *B29C 64/25* (2017.08); *B29C 64/393* (2017.08); *B33Y 30/00* (2014.12); *B33Y 50/02* (2014.12)

(58) Field of Classification Search
CPC ..... B29C 64/25; B29C 64/393; B29C 64/295; B29C 64/364; B33Y 30/00; B33Y 50/02
See application file for complete search history.

(56) References Cited

U.S. PATENT DOCUMENTS

| | | | | |
|---|---|---|---|---|
| 2008/0181982 | A1* | 7/2008 | Lane | B29C 49/4823<br>425/524 |
| 2011/0265893 | A1* | 11/2011 | Scott | B01D 46/90<br>137/544 |
| 2015/0165681 | A1* | 6/2015 | Fish | B29C 64/393<br>264/40.6 |
| 2017/0297111 | A1* | 10/2017 | Myerberg | B29C 64/165 |
| 2018/0126650 | A1* | 5/2018 | Murphree | B08B 5/04 |
| 2022/0008999 | A1* | 1/2022 | Friesth | C23C 4/04 |

FOREIGN PATENT DOCUMENTS

| | | | | |
|---|---|---|---|---|
| WO | WO-2017013454 | A2 * | 1/2017 | B22F 10/28 |
| WO | 2017184002 | A1 | 10/2017 | |

* cited by examiner

DEVICE AND METHOD FOR THE ADDITIVE MANUFACTURING OF A THREE-DIMENSIONAL WORKPIECE

FIELD

The present invention relates to a device for the additive manufacturing of a three-dimensional component. The present invention also relates to a method for the additive manufacturing of a three-dimensional component.

BACKGROUND INFORMATION

In additive manufacturing or 3D printing, liquid or solid materials are built up layer by layer to form a three-dimensional workpiece. Thermoplastic materials, in particular thermoplastic plastics, for example, can be used and are first liquefied by heating. The liquid material is then selectively applied to locations at which the workpiece is to be created. The material solidifies again as it cools.

Such a device comprises a printhead, in which the starting material is made ready for printing. Also conventional are axis systems for producing a relative movement between the printhead and the work surface on which the object is to be created. Either only the printhead, only the work surface or both the printhead and the work surface can be moved.

Some thermoplastic materials have a tendency to shrink as they cool. The shrinking leads to differing dimensions of the completed workpiece. To counteract this, so-called 3D printers with heatable build chambers are available, so that the temperature of the build chamber can be kept as constant as possible during the printing process. There are elements that can project into the build chamber, for example, and thereby change the temperature structure. In particular if these elements are not temperature-controlled, cold bridges can occur, which results in uneven temperature control of the build chamber and can lead to thermal distortion in the workpiece or component to be produced. Error-free creation of the workpiece or component to be produced is therefore not possible due to the thermal distortion that has occurred.

An object of the present invention is to provide a device that makes additive manufacturing of a three-dimensional workpiece made of a thermoplastic material more efficient and thus more cost-effective.

SUMMARY

The object may be achieved by the device according to the present invention for the additive manufacturing of a three-dimensional workpiece with the features disclosed herein and the method according to the present invention for the additive manufacturing of a three-dimensional workpiece.

According to an example embodiment of the present invention, the provided device for the additive manufacturing of a three-dimensional workpiece comprises a build chamber, at least one printhead, a receiving device for receiving the three-dimensional workpiece, an air-circulation system for controlling the temperature of and conveying a gaseous fluid, an adjustment device, comprising an x-y axis system with a printhead receptacle and a z-axis system, wherein, according to the present invention, the air-circulation system comprises a device for controlling the temperature of and conveying a gaseous fluid, an inlet device comprising at least two inlet openings connected to the build chamber and an outlet device, wherein the outlet device is integrated in the z-axis system and is disposed in such a way that it can be adjusted by means of said axis system.

The device for the additive manufacturing of a three-dimensional workpiece is also known as a 3D printer or printer.

According to an example embodiment of the present invention, the air-circulation system comprising the device for controlling the temperature of and conveying the gaseous fluid advantageously enables an optimization of the temperature control of the build chamber. The device according to the present invention for the additive manufacturing of a three-dimensional workpiece thus counteracts inhomogeneous temperature control of the build chamber and ensures a more homogeneous temperature structure throughout the build chamber.

The gaseous fluid can be air or, advantageously, an inert gas.

According to an example embodiment of the present invention, the air-circulation system also comprises the device for controlling the temperature of and conveying the gaseous fluid, by means of which the gaseous fluid is advantageously heated and conveyed into the air-circulation system. The gaseous fluid flows through the inlet device into the build chamber, fills it, flows around the workpiece to be produced and then flows through the outlet device integrated in the z-axis system. The air-circulation system of the device for the additive manufacturing of a three-dimensional workpiece thus advantageously ensures a homogeneous temperature structure within the build chamber.

The device according to the present invention for the additive manufacturing of a three-dimensional workpiece additionally combines the adjustment in the z-height of the axis with the removal of the process air for the air-circulation system. This modified ventilation system enables a more constant temperature control of the build chamber together with the workpiece or component. The temperature control is advantageously much more uniform, as a result of which there is less distortion in the workpiece or component.

This in particular advantageously achieves an improvement in the efficiency of the entire heating system of the device for the additive manufacturing of a three-dimensional workpiece. This is accomplished in particular by preventing cold or hot spots within the build chamber, which advantageously reduces workpiece distortion.

In one further development of the present invention, the outlet device comprises recesses which are disposed in a housing of the z-axis system.

This ensures that the air flow is guided through the z-axis, thus controlling the temperature of said z-axis as well. The previous non-temperature-controlled z-axes therefore advantageously have no influence on the overall temperature control of the build chamber. It is moreover advantageously achieved that now only one central z-axis can be used.

In one further development of the present invention, the recesses of the outlet device are disposed below the receiving device.

In a preferred further development of the present invention, the inlet device comprises channels and connection devices with inlet openings, wherein the gaseous fluid can be conveyed through the inlet device into the build chamber by the device for controlling the temperature and conveying.

It is thus possible to adjust the inlet and outlet devices with regard to air inflow and outflow, which can advantageously be adapted depending on the component.

In one further development of the present invention, the inlet openings of the inlet device are disposed above the workpiece and the z-axis system.

In one further development of the present invention, the inlet openings of the inlet device comprise valves.

Adjustable inlet and outlet slots or inlet and outlet valves advantageously enable better control of the air flow. The main advantage here is the central removal or central intake of the gaseous fluid or the process air below the build chamber, which enables an air flow that results in homogeneous temperature control and at the same time takes place in the same assembly as the height adjustment of the receiving device for the workpiece or the substrate carrier. Of the previous five openings in the floor of the build chamber, for instance, now, due to the design according to the present invention, only one opening is necessary. The telescopic axis of the z-axis is temperature-controlled at the same time, and thus advantageously no longer represents a cold bridge. Cables for sensors and lines, for example or cables for heating the build plate, can also be laid in the housing or the ventilation shaft. Concentrating these functions advantageously enables a significantly more cost-effective implementation and increases the accessibility and maintainability of the build chamber. This advantageously makes it possible to pull the entire build chamber out of the printer, for example. To do this, the substrate carrier is disassembled, for instance, and the z-axis or telescopic axis moves out of the build chamber.

The efficiency of the build chamber temperature control as a whole is moreover improved, because, due to the modified z-axis, less heat is dissipated. The placement of the inlet and outlet also leads to a more even distribution of the introduced heat, as a result of which cold or hot spots within the build chamber are prevented. Furthermore, as already described, there is no need for another opening in the build chamber, which simplifies changing the build chamber for maintenance purposes.

In one further development of the present invention, the inlet openings of the inlet device are suitable for receiving interchangeable inlet molds, wherein the inlet molds have different geometries or opening geometries depending on the workpiece geometry.

According to the present invention, a method for the additive manufacturing of a three-dimensional workpiece using a device according to any one of the preceding embodiment examples is proposed.

Further advantages will become apparent from the figures and the description of embodiment examples of the present invention.

BRIEF DESCRIPTION OF THE DRAWINGS

FIG. 2 shows a view of a device for the additive manufacturing of a three-dimensional workpiece comprising an air-circulation system.

FIG. 3 shows a view of a first embodiment of a device according to the present invention for the additive manufacturing of a three-dimensional workpiece.

DETAILED DESCRIPTION OF EXAMPLE EMBODIMENTS

Figure 1:
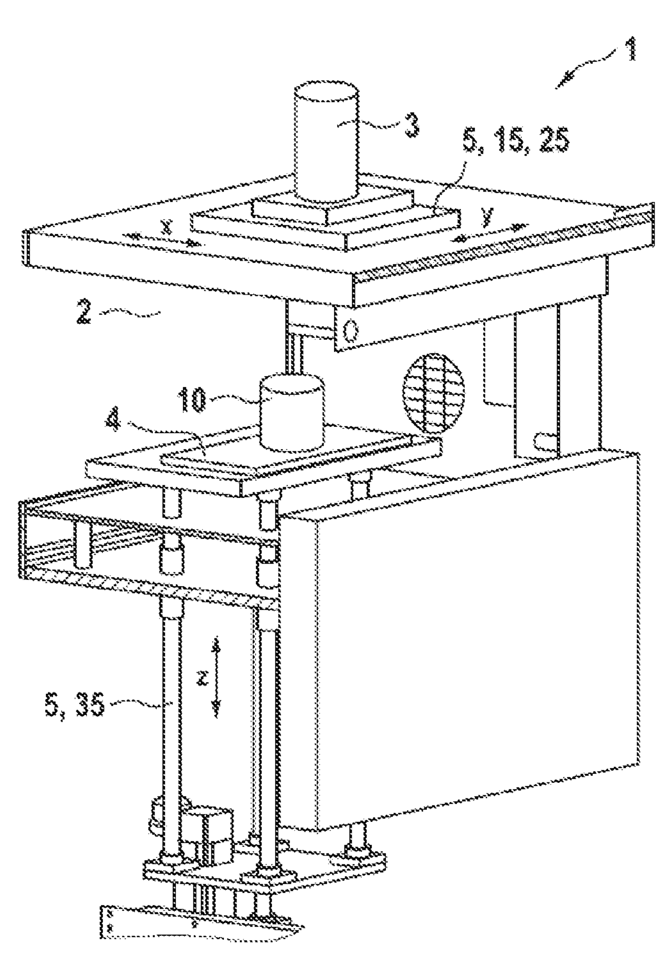
FIG. 1 shows a view of a device for the additive manufacturing of a three-dimensional workpiece according to the related art.

FIG. 1 shows a view of a device 1 described in the related art for the additive manufacturing of a three-dimensional workpiece 10. The shown device 1, also referred to as a 3D printer or printer, comprises a, for example heated, build chamber 2, an adjustment device 5, a printhead 3 and a receiving device 4 for receiving the three-dimensional workpiece 10. The adjustment device 5 comprises an x-y axis system 15 disposed above the workpiece 10 with a printhead receptacle 25 for adjusting the printhead 3 in an x-y plane and a z-axis system 35 disposed below the workpiece for adjusting the receiving device 4 in z-direction.

With its movements of the printhead and the receiving device, the adjustment device 5 ensures the three-dimensional manufacturing of the workpiece on the receiving device 4 or the so-called substrate plate or the substrate carrier. For this purpose, a, for example thermoplastic, material is liquefied and applied layer by layer to the substrate carrier 4, so that the workpiece to be produced is created.

At the beginning of a printing process, the build chamber 2 is heated to process temperature, for example by means of a not depicted integrated heating system. Printing is carried out on a substrate carrier 4, which is specially coated to improve the adhesion of the liquefied thermoplastic material on the surface of the substrate carrier 4. The substrate carrier 4 rests on a print bed inside the build chamber 2. It can be held in position via a vacuum or a stop pin.

Figures 2, 3:
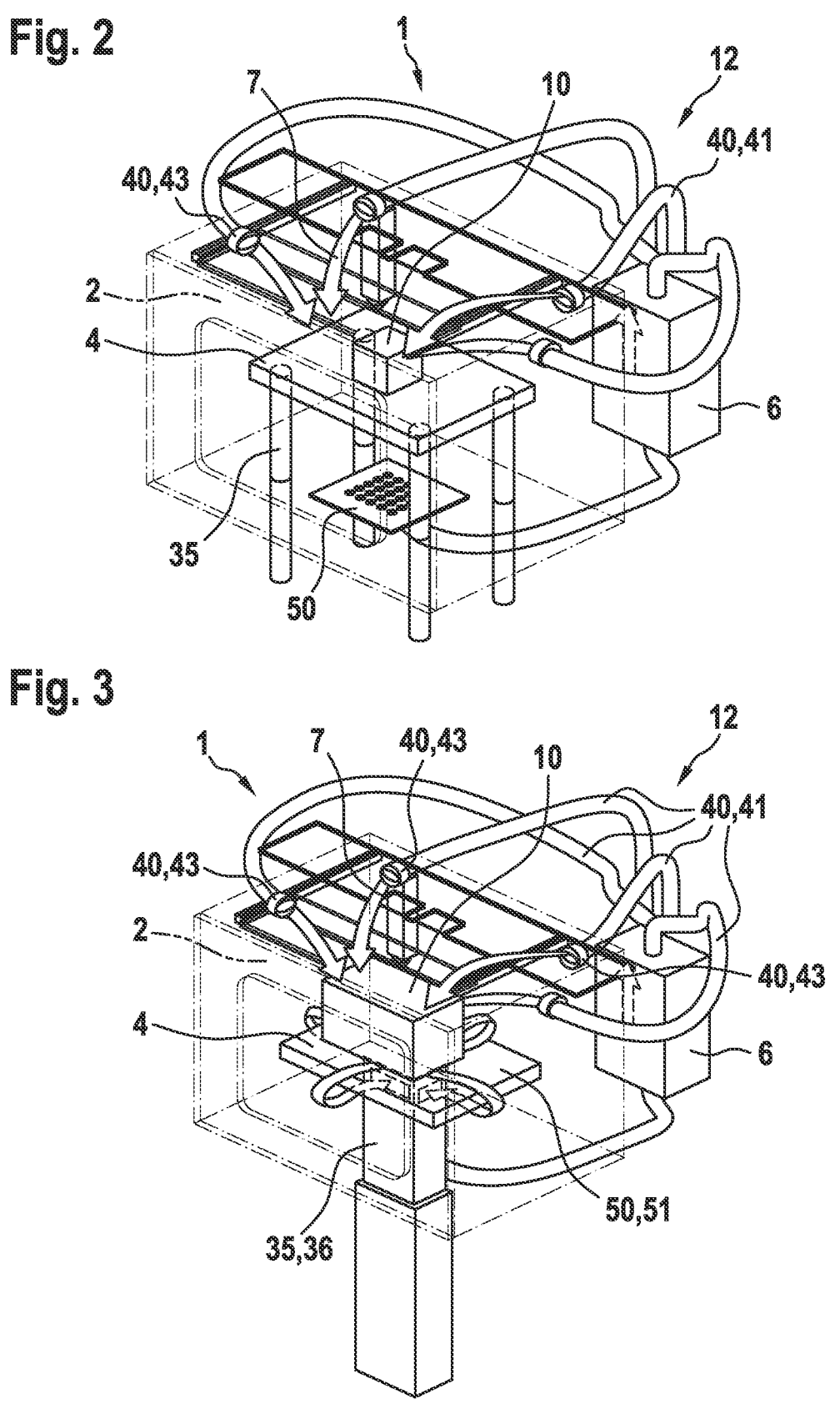

FIG. 2 shows a view of a device 1 for the additive manufacturing of a three-dimensional workpiece 10 with an air-circulation system 12, wherein the air-circulation system 12 comprises a device 6 for controlling the temperature of and conveying a gaseous fluid 7, an inlet device 40 and an outlet device 50. The inlet device 40 comprises channels 41 and inlet openings 43 which are connected to the build chamber 2. The substrate carrier 4 on which the workpiece 10 is placed is disposed in the build chamber 2. The substrate carrier 4 is disposed on the z-axis system 35. The gaseous fluid 7 or process air is heated in the device 6 for controlling the temperature and conveying, and is conveyed into the build chamber 2 via a not depicted conveying system inside the device 6 through the channels 41 of the inlet device 40 at inlet openings 43. The process air 7 flows into the build chamber 2, is homogeneously distributed there and, during extraction by suction, flows past the workpiece 10 to the outlet device 50 which is immovably disposed on the floor of the build chamber 2.

The disadvantage here is that the outlet device 50 is fixed to the floor of the build chamber 2. This makes a targeted extraction by suction of the process air 7 to generate an optimum air flow at the workpiece 10 more difficult.

FIG. 3 shows a view of a first embodiment of a device 1 according to the present invention, i.e. a printer, for the additive manufacturing of a three-dimensional workpiece 10, wherein the printer 1 comprises the build chamber 2, the printhead 3, the receiving device 4, i.e. the substrate carrier for receiving the three-dimensional workpiece 10, an air-circulation system 12 for controlling the temperature of and conveying the gaseous fluid 7 and an adjustment device 5. The adjustment device 5 comprises a not depicted x-y axis system 15 with a not depicted printhead receptacle 25 and a z-axis system 35. The air-circulation system 12 comprises the device 6 for controlling the temperature of and conveying the gaseous fluid 7 or the process air, an inlet device with four inlet openings 43 connected to the build chamber 2 and an outlet device 50, wherein the outlet device 50 is integrated in the z-axis system 35 and is disposed in such a way that it can be adjusted by means of said axis system.

The outlet device 50 comprises recesses 51 which are disposed in a housing 36 of the z-axis system 35.

The recesses 51 of the outlet device 50 are disposed below the receiving device 4, i.e. the substrate carrier.

The inlet device 40 comprises channels 41 with inlet openings 43, wherein the gaseous fluid 7 can be conveyed through the inlet device 40 into the build chamber 2 by the device 6 for controlling the temperature and conveying. Valves are disposed in the inlet openings 43 in order to be able to regulate the supply of process air 7.

The inlet openings 43 of the inlet device 40 are disposed above the workpiece 10 and the z-axis system 35.

By means of the device 6 for controlling the temperature and conveying, the air-circulation system 12 conveys the gaseous fluid 7 or the process air, which is preferably an inert gas, into the build chamber 2 via the channels 41 of the inlet device 40 into the inlet openings 43 which are connected to the build chamber 2. The process air 7 flowing out of the inlet openings 43 via valves flows into the build chamber 2 and is distributed homogeneously in said chamber. During extraction by suction, the process air 7 flows over the workpiece 10 disposed on the substrate carrier 4 to the recesses 51 of the outlet device 50. The air-circulation system 12 ensures that the process air 7 flows in and out as required, wherein the process air 7 is removed from the build chamber 2 via the outlet device 50. The air-circulation system 12 accomplishes an optimization of the temperature control of the build chamber 2.

The inlet openings 43 of the inlet device 40 are disposed above the workpiece 10.

Integrating the outlet device 50 in the housing 36 of the z-axis system 35 makes it possible for the outlet device 50 to be adjustable in the z-height of the axis 35 and thus ensures optimized removal of the process air 7 for the air-circulation system 12.

This special arrangement of the components 40, 50 of the air-circulation system provides a more constant temperature control of the build chamber 2 together with the workpiece 10.

The arrangement of the recesses 51 of the outlet device 50 in the housing 36 of the z-axis system 36 below the receiving device 4 ensures that the air flow of the process air 7 is guided through the z-axis 35 or through the housing 36 of the z-axis 35, as a result of which the temperature of the latter is controlled as well. The printer 1 now comprises only one central z-axis system 35.

The device 6 for controlling the temperature of and conveying the process air 7 can be regulated, so that the air flow and/or the temperature of the process air can be adjusted depending on the workpiece 10 and the required manufacturing process. The arrangement of the inlet device 40 in conjunction with the arrangement of the outlet device 50 ensures air inflow and outflow that can be adjusted depending on the workpiece 10.

The key is the central removal or central intake of the process air 7 below the build chamber 2, which enables an air flow that results in homogeneous temperature control and at the same time takes place in the same assembly as the height adjustment of the receiving device 4 for the workpiece 10 or the substrate carrier. The temperature of the telescopic axis of the z-axis 35 is controlled as well.

The air-circulation system 12 forms a closed circuit.

Figure 4:
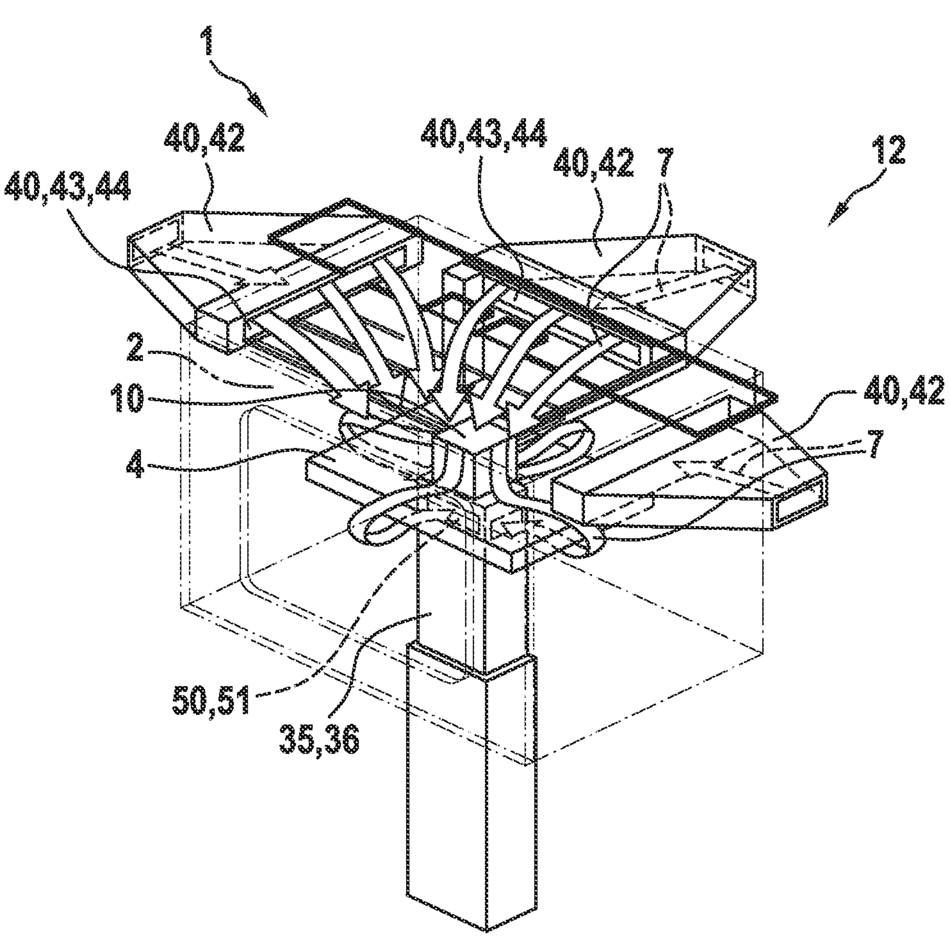
FIG. 4 shows a view of a second embodiment of the device according to the present invention for the additive manufacturing of a three-dimensional workpiece.
Figure 5A:
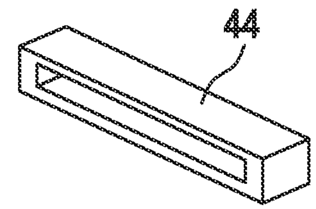
FIGS. 5A-5E show sectional drawings of inlet molds, according to example embodiments of the present invention.
Figure 5B:
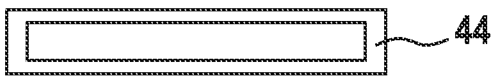
Figure 5C:
Figure 5D:
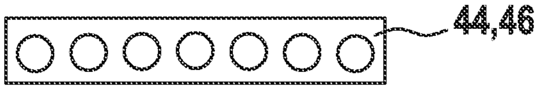
Figure 5E:

FIG. 4 shows a view of a second embodiment of the device 1 according to the present invention, i.e. a printer, for the additive manufacturing of a three-dimensional workpiece 10, wherein the printer 1 comprises the build chamber 2, the printhead 3, the receiving device 4, i.e. the substrate carrier for receiving the three-dimensional workpiece 10, an air-circulation system 12 for controlling the temperature of and conveying the gaseous fluid 7 and an adjustment device 5.

The adjustment device 5 comprises a not depicted x-y axis system with a not depicted printhead receptacle 25 and a z-axis system 35. The air-circulation system 12 comprises the device 6 for controlling the temperature of and conveying the gaseous fluid 7 or the process air, an inlet device 40 with three inlet openings 43 connected to the build chamber 2 and an outlet device wherein the outlet device 50 is integrated in the z-axis system 35 and is disposed in such a way that it can be adjusted by means of said axis system.

The outlet device 50 comprises recesses 51 which are disposed in a housing 36 of the z-axis system 35.

The recesses 51 of the outlet device 50 are disposed below the receiving device 4, i.e. the substrate carrier.

The inlet device 40 comprises channels 41 and connection devices 42 with inlet openings 43, wherein the gaseous fluid 7 can be conveyed through the inlet device 40 into the build chamber 2 by the device 6 for controlling the temperature and conveying.

The inlet openings 43 of the inlet device 40 are disposed above the workpiece 10 and the z-axis system 35.

By means of the device 6 for controlling the temperature and conveying, the air-circulation system 12 conveys the gaseous fluid 7 or the process air, which is preferably an inert gas, into the build chamber 2 via here not depicted channels 41 of the inlet device 40 into the connection devices 42 which are connected via inlet openings 43 to the build chamber 2. The process air 7 flowing out of the inlet openings 43 flows into the build chamber 2 and is distributed homogeneously in said chamber. During extraction by suction, the process air 7 flows over the workpiece 10 disposed on the substrate carrier 4 to the recesses 51 of the outlet device 50. The air-circulation system 12 ensures that the process air 7 flows in and out as required, wherein the process air 7 is removed from the build chamber 2 via the outlet device 50. The air-circulation system 12 accomplishes an optimization of the temperature control of the build chamber 2.

The inlet openings 43 of the connection devices 42 are disposed above the workpiece 10 and are respectively disposed such that they are offset 90° relative to one another.

Integrating the outlet device 50 in the housing 36 of the z-axis system 35 makes it possible for the outlet device 50 to be adjustable in the z-height of the axis 35 and thus ensures optimized removal of the process air 7 for the air-circulation system 12.

This special arrangement of the components 40, 50 of the air-circulation system provides a more constant temperature control of the build chamber 2 together with the workpiece 10.

The arrangement of the recesses 51 of the outlet device 50 in the housing 36 of the z-axis system 36 below the receiving device 4 ensures that the air flow of the process air 7 is guided through the z-axis 35 or through the housing 36 of the z-axis 35, as a result of which the temperature of the latter is controlled as well. The printer 1 now comprises only one central z-axis system 35.

The device 6 for controlling the temperature of and conveying the process air 7 can be regulated, so that the air flow and/or the temperature of the process air can be adjusted depending on the workpiece 10 and the required manufacturing process. The arrangement of the connection devices 42 of the inlet device 40 in conjunction with the arrangement of the outlet device 50 ensures air inflow and outflow that can be adjusted depending on the workpiece 10.

The key is the central removal or central intake of the process air 7 below the build chamber 2, which enables an air flow that results in homogeneous temperature control and at the same time takes place in the same assembly as the height adjustment of the receiving device 4 for the workpiece 10 or the substrate carrier.

The temperature of the telescopic axis of the z-axis 35 is controlled as well.

The air-circulation system 12 in this embodiment example likewise forms a closed circuit.

The inlet openings 43 of the inlet device 40 are suitable for receiving interchangeable inlet molds 44, wherein the inlet molds 44 have different geometries or opening geometries depending on the workpiece geometry of the workpiece 10. In this embodiment, the inlet openings 43 have a rectangular opening geometry.

The opening geometry of the inlet molds 44 can be adapted depending on the size of the component, so that optimum temperature control of the build chamber 2 is possible. The shape of the inlet molds 44 or the inlet and outlet can vary (see FIGS. 5A-5E). The inlet molds 44 thus have different air slot shapes.

FIGS. 5A-5E show a variety of sectional drawings of inlet molds 44 of the inlet openings 43 of the inlet device 40. The inlet mold 44 can vary, and can consist of a long rounded slot 45 (5C), for instance, or of many small holes 46 (5D).

The selection of the geometry depends, for instance, on the result of corresponding flow simulations, which makes it possible to select an optimum shape.

As an alternative to an inlet mold 44, 45, 46 which is configured in one piece, it is possible to place a plurality of inlets 47 in one inlet mold 44 (5E).

The invention claimed is:

1. A device for additive manufacturing of a three-dimensional workpiece, comprising:
- a build chamber;
- a receiving platform arranged in the build chamber;
- at least one printhead, wherein the three-dimensional workpiece is printable onto the receiving platform by the at least one printhead; and
- an air-circulation system configured to control a temperature of the build chamber with a gaseous fluid;
- wherein:
  - the air-circulation system includes:
    - a gas flow chamber arranged at an upper region of the build chamber by which the gaseous fluid is introducible into the build chamber; and
    - a plurality of outlet molds that are structurally identical to one another at their respective exterior perimeters and that are geometrically differently structured than one another at their respective internal regions that are surrounded by their respective exterior perimeters; and
  - the gas flow chamber includes an opening facing the build chamber into which the plurality of outlet molds are interchangeably insertable so that different ones of the plurality of outlet molds are present at different times as a respective interface between the gas flow chamber and the build chamber, causing different respective flow patterns of the gaseous fluid from the gas flow chamber into the build chamber at the different times.

2. The device according to claim 1, further comprising a telescoping arm to which the receiving platform is attached, wherein the telescoping arm (I) is movable in a vertical direction by which a distance of the receiving platform from the at least one printhead is variable and (II) includes recesses via which the gaseous fluid is purgeable from the build chamber.

3. The device according to claim 2, wherein the recesses are disposed below the receiving platform.

4. The device according to claim 1, wherein the gaseous fluid is air or an inert gas.

5. The device according to claim 1, wherein the outlet molds comprise respective recesses disposed within the respective internal regions of the respective outlet molds.

6. The device according to claim 1, wherein the gas flow chamber is positioned above the receiving platform.

7. A method for additive manufacturing of three-dimensional workpieces using a workpiece builder, the workpiece builder includes (I) a build chamber, (II) a receiving platform arranged in the build chamber, (III) at least one printhead onto which the three-dimensional workpieces are printable by the at least one printhead onto the receiving platform by the at least one printhead, and (IV) an air-circulation system configured to control a temperature of the build chamber with a gaseous fluid, wherein the air-circulation system includes a gas flow chamber that is arranged at an upper region of the build chamber and includes an opening facing the build chamber and via which the gaseous fluid is introducible into the build chamber, the method comprising:
- in a preparation period, inserting a first one of a plurality of outlet molds into the opening in a first printing period that follows the preparation period, printing a first one of the three- dimensional workpieces onto the receiving platform while the gaseous fluid flows from the gas flow chamber into the build chamber via the first one of the plurality of outlet molds;
- in a transition period that follows the first printing period:
  - removing the first one of the plurality of outlet molds from the opening; and
  - inserting a second one of a plurality of outlet molds into the opening, thereby replacing the first one of the plurality of outlet molds with the second one of the plurality of outlet molds; and
- in a second printing period that follows the transition period, printing a second one of the three-dimensional workpieces onto the receiving platform while the gaseous fluid flows from the gas flow chamber into the build chamber via the second one of the plurality of outlet molds;
- wherein the plurality of outlet molds:
  - are structurally identical to one another at their respective exterior perimeters so that they are interchangeably insertable into the opening of the gas flow chamber as respective interfaces between the gas flow chamber and the build chamber; and
  - are geometrically differently structured than one another at their respective internal regions that are surrounded by their respective exterior perimeters, thereby causing different respective flow patterns of the gaseous fluid from the gas flow chamber into the build chamber at the respective printing periods.

* * * * *